(12) United States Patent
Wang

(10) Patent No.: US 9,431,924 B2
(45) Date of Patent: Aug. 30, 2016

(54) POWER SOURCE INVERTER FOR USE WITH A PHOTOVOLTAIC SOLAR PANEL

(71) Applicant: Board of Trustees of Michigan State University, East Lansing, MI (US)

(72) Inventor: Bingsen Wang, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 227 days.

(21) Appl. No.: 14/259,205

(22) Filed: Apr. 23, 2014

(65) Prior Publication Data

US 2014/0328102 A1 Nov. 6, 2014

Related U.S. Application Data

(60) Provisional application No. 61/819,792, filed on May 6, 2013.

(51) Int. Cl.
*H02M 7/5387* (2007.01)
*H02M 1/15* (2006.01)
*H02J 3/38* (2006.01)

(52) U.S. Cl.
CPC ............. *H02M 7/5387* (2013.01); *H02M 1/15* (2013.01); *H02J 3/385* (2013.01); *Y02E 10/58* (2013.01)

(58) Field of Classification Search
CPC ........ H02M 1/14; H02M 1/143; H02M 1/15; H02M 1/44; H02M 7/5387; H02M 7/53871
See application file for complete search history.

(56) References Cited

U.S. PATENT DOCUMENTS

| | | | | |
|---|---|---|---|---|
| 5,625,539 A | * | 4/1997 | Nakata | H02M 7/4807 363/132 |
| 8,009,446 B2 | * | 8/2011 | Chou | H02M 1/14 363/41 |
| 2009/0046492 A1 | * | 2/2009 | Zacharias | H02M 1/44 363/134 |
| 2011/0242867 A1 | | 10/2011 | Wang et al. | |
| 2011/0273909 A1 | * | 11/2011 | Christopher | H02M 3/3376 363/17 |

* cited by examiner

*Primary Examiner* — Matthew Nguyen
(74) *Attorney, Agent, or Firm* — Harness, Dickey & Pierce, P.L.C.

(57) ABSTRACT

An improved topology is presented for a single phase power source inverter that is designed to minimize double frequency ripple. The inverter circuit includes: a capacitor coupled in parallel across a direct current (DC) voltage source; a bridge circuit having three legs electrically connected in parallel with the voltage source and each other, such that each leg of the bridge circuit being comprised of two switches coupled in series with each other; a low pass filter electrically connected between the bridge circuit and a load; an auxiliary inductor having a first terminal electrically connected to one leg of the bridge circuit and a second terminal electrically connected to another leg of the bridge circuit and the load; and a controller that drives the switches of the bridge circuit in a manner that maintains instantaneous power transfer across the bridge circuit constant.

16 Claims, 4 Drawing Sheets

POWER SOURCE INVERTER FOR USE WITH A PHOTOVOLTAIC SOLAR PANEL

CROSS-REFERENCE TO RELATED APPLICATIONS

This application claims the benefit of U.S. Provisional Application No. 61/819,792, filed on May 6, 2013. The entire disclosure of the above application is incorporated herein by reference.

FIELD

The present disclosure relates to power source inverter which may be used with a photovoltaic solar panel.

BACKGROUND

The ever increasing demand for clean energy that is alternative to the conventional fossil-fuel based power generation has been one of the primary driving forces for the recent development of photovoltaic (PV) technologies, especially in the past decade. The majority of new installations of PV generation systems is grid interactive and enjoyed a 70% increase of capacity worldwide in 2008. The power electronic converter is an indispensable subsystem that interfaces the PV modules with electric power systems.

As indicated by a rich body of literature records, various new topologies of PV inverters have been proposed and studied. Nonetheless, previous studies suggest that the PV inverter still remains the weak link in PV power generation systems with regard to its reliability. The lifetime of PV inverters is approximately 5-10 years as opposed to the 30-year lifetime of PV panels. The relatively short lifetime of inverters not only increases the effective operating cost, but also poses a significant stress on the environment in light of life cycle analysis, which contradicts one of the primary motivations of developing renewable energy generation, namely to relieve the stress to the environment imposed by the energy production processes.

The key issues related to PV inverters that negatively affect the reliability performance include the electrolytic capacitor, which commonly exists in PV inverters using the dominant topology of voltage source inverters (VSIs). The less frequently researched current source inverters (CSIs) could potentially eliminate the electrolytic capacitor while providing additional benefits. The adoption of CSI in PV systems, however, is significantly limited by the availability of suitable power semiconductor devices. Three-phase CSI have also been proposed for application in PV generation systems. Thus far, the single-phase topology is predominant for residential systems with capacity below 10 kW peak power.

For single phase dc/ac inverter systems, with no regard to either VSI or CSI topology, the pulsating nature of the instantaneous power flow is in common. The pulsating power flow will manifest itself in the form of either dc-link current ripple or voltage ripple in a single-phase CSI or VSI, respectively. The low-frequency ripple on the dc-link will potentially have adverse consequences. Therefore, it is desirable to develop an improved topology for a power inverter that minimizes the low frequency ripple.

This section provides background information related to the present disclosure which is not necessarily prior art.

SUMMARY

This section provides a general summary of the disclosure, and is not a comprehensive disclosure of its full scope or all of its features.

An improved topology is presented for a single phase power source inverter that is designed to minimize double-frequency ripple. The inverter circuit includes: a capacitor coupled in parallel across a direct current (DC) voltage source; a bridge circuit having three legs electrically connected in parallel with the voltage source and each other, such that each leg of the bridge circuit is comprised of two switches coupled in series with each other; a low-pass filter electrically connected between the bridge circuit and power grid; an auxiliary inductor having a first terminal electrically connected to one leg of the bridge circuit and a second terminal electrically connected to the power grid and the other leg of the bridge circuit; and a controller that drives the switches of the bridge circuit in a manner that maintains instantaneous power transfer across the bridge circuit constant.

In one aspect of this disclosure, the capacitor is a non-electrolytic capacitor.

In another aspect of this disclosure, the DC voltage source is implemented by a photovoltaic solar panel.

Further areas of applicability will become apparent from the description provided herein. The description and specific examples in this summary are intended for purposes of illustration only and are not intended to limit the scope of the present disclosure.

DRAWINGS

Figure 1:
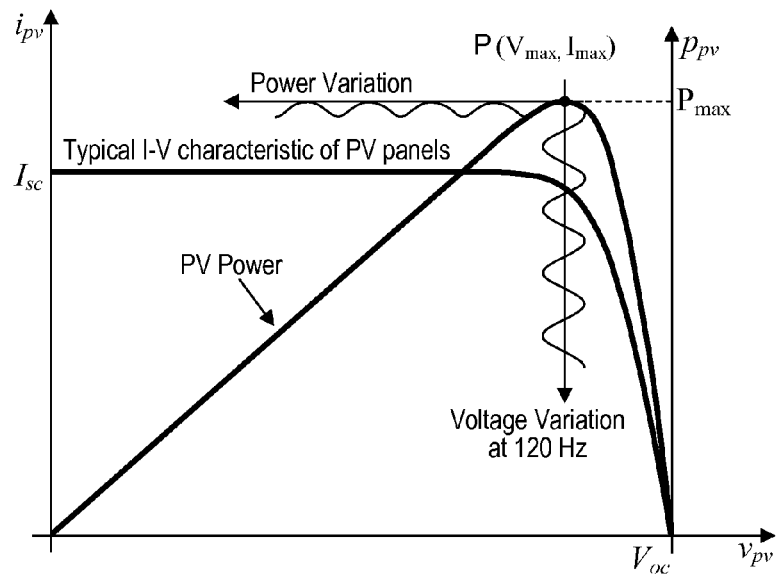
FIG. 1 is a diagram illustrating the low-frequency effect on maximum power point tracking in a single phase power inverter.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Example embodiments will now be described more fully with reference to the accompanying drawings.

In a single-phase system, if the grid voltage v and the current i are given by $$v(t) = V \cos(\omega t)$$

$$i(t) = I \cos(\omega t + \phi) \quad (1)$$

where V and I are the magnitudes of the grid voltage and the current supplied by the inverter, respectively; $\omega$ is the angular frequency of the ac system; $\phi$ is the power factor angle. Then the instantaneous power flow p(t) is given by $$p(t) = v(t)i(t) \quad (2)$$

$$= \frac{1}{2} VI\cos(\phi) + \frac{1}{2} VI\cos(2\omega t + \phi)$$

The double-frequency term in (2) will cause dc-link current ripple or voltage ripple in a single-phase CSI or VSI, respectively. The oscillating current or voltage will degrade the performance of maximum power point tracking (MPPT) in PV power generation system. FIG. 1 illustrates a typical i-v characteristic of a PV panel on the $i_{pv}-v_{pv}$ plane. A power curve is overlaid on top of the i-v curve in the $p_{pv}-v_{pv}$ plane. As the power output from the PV panel reaches the maximum $P_{max}$ on the power curve, the maximum power point on the i-v curve corresponds to the point P labeled in FIG. 1. The terminal voltage and current $V_{max}$ and $I_{max}$ at which the PV panel delivers the maximum power are not labeled on the $i_{pv_-}$ and $v_{pv_-}$axis for avoidance of cluttering the figure. It is evident that the output power will be typically below $P_{max}$ if the terminal voltage varies around $V_{max}$ except for discrete operating points.

Figure 2:
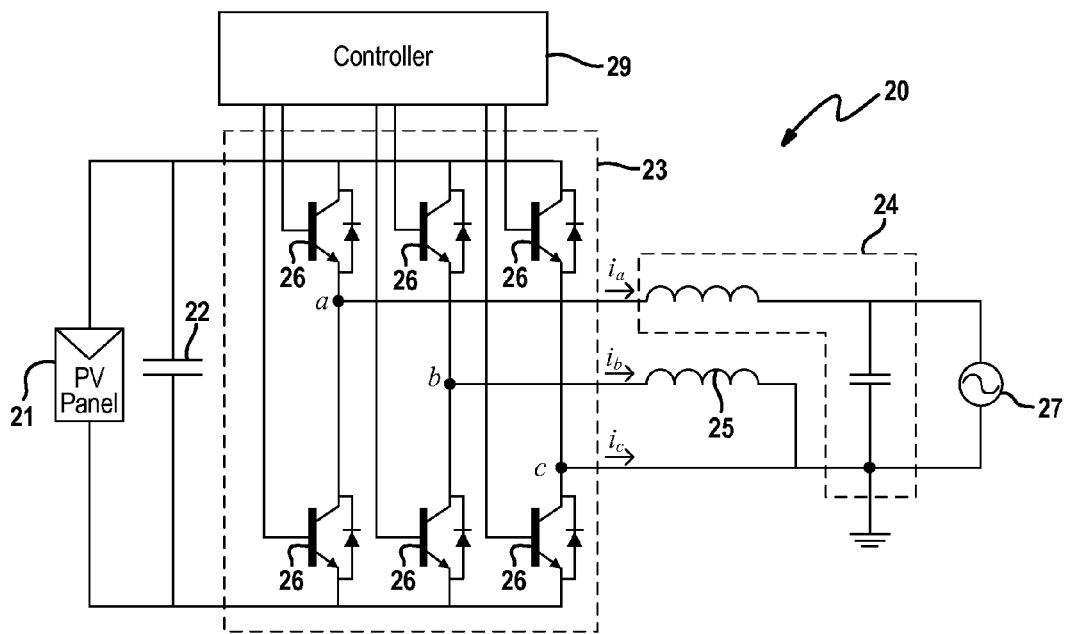
FIG. 2 is a schematic of a proposed topology for a power inverter.

FIG. 2 depicts a proposed topology for an inverter circuit 20 electrically coupled to a voltage source 21. The inverter circuit 20 is comprised generally of a capacitor 22, a bridge circuit 23, a low pass filter circuit 24 and an auxiliary inductor 25 connected to one leg of the bridge circuit 23. A controller 29 can be used to drive each of the switches in the bridge circuit in a manner further described below. In an example embodiment, the voltage source is further defined as a photovoltaic solar panel although other types of voltage sources fall within the scope of this disclosure. Likewise the inverter circuit 20 may have application outside the field of solar panels.

In one embodiment, the bridge circuit 23 has a conventional arrangement of three legs 23A, 23B, 23C connected in parallel with the voltage source 21 and each other. Each leg includes two switches 26 coupled in series with each other. The switches 26 may be implemented by insulated-gate bipolar transistors (IGBTs), metal-oxide-semiconductor field-effect transistors (MOSFETs) or another type of switching device. Bridge circuits having other topologies are also contemplated by this disclosure.

The low-pass filter 24 is connected between the bridge circuit 23 and the load 27. In one embodiment, the low pass filter 24 is implemented by an LC circuit. In this case, a primary inductor has one terminal coupled between the two switches of the first leg of the bridge circuit while the other terminal is coupled to the load. The capacitor is coupled in parallel across the load. Other implementations for a low pass filter circuit are contemplated by this disclosure. In some embodiments, the load 27 can be a power grid for a home although other types of loads also falls within the scope of this disclosure.

The auxiliary inductor 25 has one terminal coupled between the two switches which comprise the second leg of the bridge circuit while the other terminal of the auxiliary inductor 25 is coupled to the load 27. The auxiliary inductor 25 facilitates the use of a capacitor 22 having a capacitance one hundred times less than conventional inverter circuits. In some embodiments, the capacitor 22 may be a non-electrolytic capacitor. Such capacitors are more reliable and have a useful lifetime that more closely correlates with a photovoltaic solar panel, thereby reducing the maintenance and replacement cost for this topology. Moreover, the auxiliary inductor 25 operates to cancel out the double-frequency ripple in the DC output and thereby achieves greater efficiency for the photovoltaic solar panel.

Figure 3:
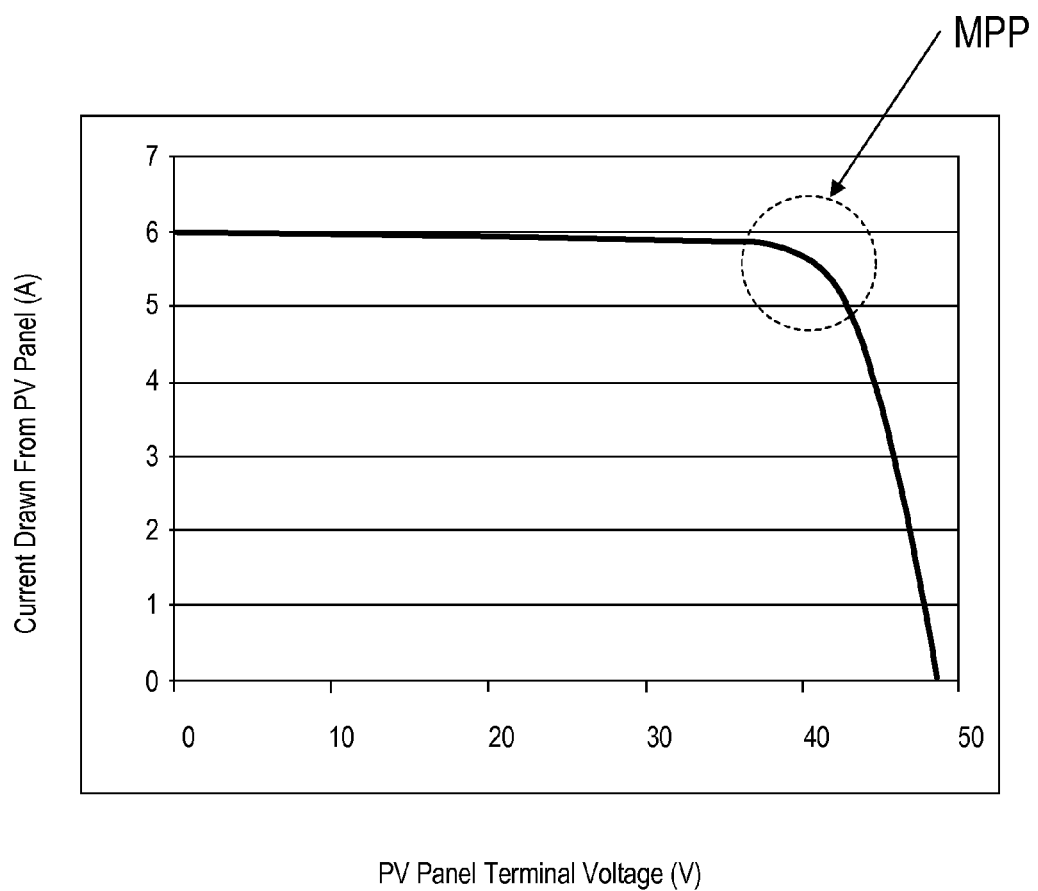
FIG. 3 is a graph depicting the maximum power point for a example PV panel application.

To draw the maximum power from a PV panel, a controller must be used to vary the load from the grid such that the current and voltage output of the PV panel are at the maximum power point. The maximum power location is at the bend of the current v. voltage curve as shown in FIG. 3.

Modern PV panels use maximum power point tracking (MMPT) to adjust the load of the inverter and draw the maximum power from the PV as the irradiance changes throughout the day. Because of AC power flowing back through the inverter to the DC link, a ripple effect demonstrates itself in a double-frequency sinusoidal variation of the DC output voltage. The MPPT cannot match the resulting DC output variation, creating a mismatch between the load and maximum PV output, thereby decreasing efficiency.

The key to the operation of the proposed topology lies in the control of the converter bridge such that the instantaneous power transfer across the switching bridge is maintained constant. For the determination of the appropriate phase-b voltage $v_b$, the concept of space vector is utilized.

The voltage space vector at the ac terminals of the converter is defined as $$\underline{v} = \frac{2}{3}(v_a + \alpha v_b + \alpha^2 v_c) \quad (3)$$

where $$\alpha = e^{j\frac{2\pi}{3}}.$$

The three-phase output voltages of the converter are $$v_a = V_a \cos(\omega t)$$

$$v_b = V_b \cos(\omega t + \phi_{vb})$$

$$v_c = 0 \quad (4)$$

with the voltage magnitude $V_b$ of phase-b and its phase angle $\phi_{vb}$ to be determined. Substituting (4) into (3) yields $$\underline{v} = \frac{1}{3}(V_a + \alpha V_b e^{j\phi_{vb}})e^{j\omega t} + \frac{1}{3}(V_a + \alpha V_b e^{-j\phi_{vb}})e^{-j\omega t} \quad (5)$$

In a similar manner, the current space vector at the ac terminals of the converter is $$\underline{i} = \frac{2}{3}(i_a + \alpha i_b + \alpha^2 i_c) \quad (6)$$

The three-phase currents are $$i_a = I_a \cos(\omega t + \phi)$$

$$i_b = I_b \cos(\omega t + \phi_{ib})$$

$$i_c = i_a - i_b \quad (7)$$

where $\phi$ the power factor angle, which is zero for unity power factor operation. The magnitude $I_b$ and the phase angle $\phi_{ib}$ of phase-b current are to be determined. Substitution of (7) into (6) leads to $$\underline{i} = \frac{1}{\sqrt{3}}[I_a e^{j(\phi+\pi/6)} + jI_b e^{j\phi_{ib}}]e^{j\omega t} + \frac{1}{\sqrt{3}}[I_a e^{j(-\phi+\pi/6)} + jI_b e^{-j\phi_{ib}}]e^{-j\omega t} \quad (8)$$

The instantaneous power flow across the converter can be expressed in terms of the defined voltage and current space vectors $\underline{v}$ and $\underline{i}$.

$$p(t) = \frac{3}{2}\text{Re}(\underline{v}\underline{i}^*) \quad (9)$$

where Re(·) denotes the real component of a complex quantity and '*' denotes the conjugate of a complex variable. Substituting (8) and (5) into (9) yields $$p(t) = \frac{1}{2}V_a I_a \cos(\phi) + \quad (10)$$
$$\frac{1}{2}[V_a I_a \cos(2\omega t + \phi) + V_b I_b \cos(2\omega t + \phi_{vb} + \phi_{ib})]$$

In order for p(t) to be constant, it requires that the time varying term in (10) to be constant (i.e. zero). Based on the relation between the voltage across and the current through the inductor, it follows that $$V_b = \omega L_b I_b \quad (11)$$
$$\phi_{vb} = \phi_{ib} + \frac{\pi}{2}$$

The following equations describe the critical condition for maintaining the instantaneous power flow across the converter bridge to be constant.

$$V_b = \sqrt{\omega L_b V_a I_a} \quad (12)$$
$$\phi_{vb} = \frac{1}{2}\left(\phi - \frac{\pi}{2}\right)$$

Once the condition that satisfies the constant instantaneous power flow is known, the reference voltages are known for each phase leg. Assume $v^*_a$ is the reference for the output voltage that is applied to the load and $v^*_b$ is the reference for the voltage that is applied to the auxiliary inductor $L_b$. The modulation functions for the upper switches in each phase leg are given by $$m_{ap} = \frac{1 + v^*_a/V_{dc}}{2} \quad (13)$$
$$m_{bp} = \frac{v^*_b}{V_{dc}} + \frac{1 - v^*_a/V_{dc}}{2}$$
$$m_{cp} = \frac{1 - v^*_a/V_{dc}}{2}$$

It is understood that lower switches in each phase leg are driven in a complementary manner. In this way, the controller 29 can drive the switches of the bridge circuit 23 in a manner that maintains instantaneous power transfer across the bridge circuit constant.

In one embodiment, the functionality of the controller 29 can be implemented by software instructions embedded in a microprocessor. It is understood that only the pertinent steps of the control algorithm are discussed above but that other software instructions may be needed to control operation of the inverter. It is also understood that the functionality of the controller 29 can be implemented by an application specific integrated circuit (ASIC) or other suitable electric circuits.

Figures 4A, 4B:
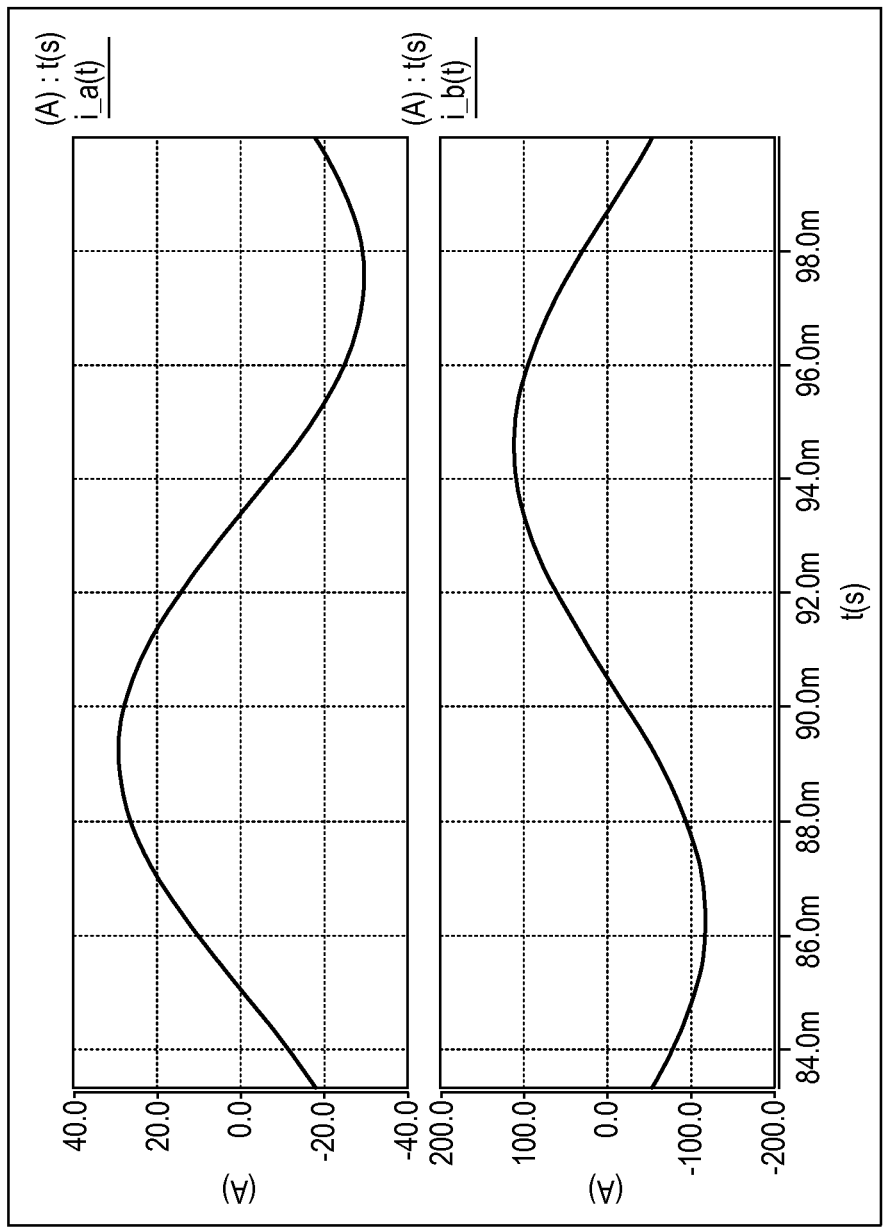
FIGS. 4A and 4B are graphs of simulated waveforms of output currents $i_a$ and $i_b$, respectively, from the proposed power source inverter.
Figure 5:
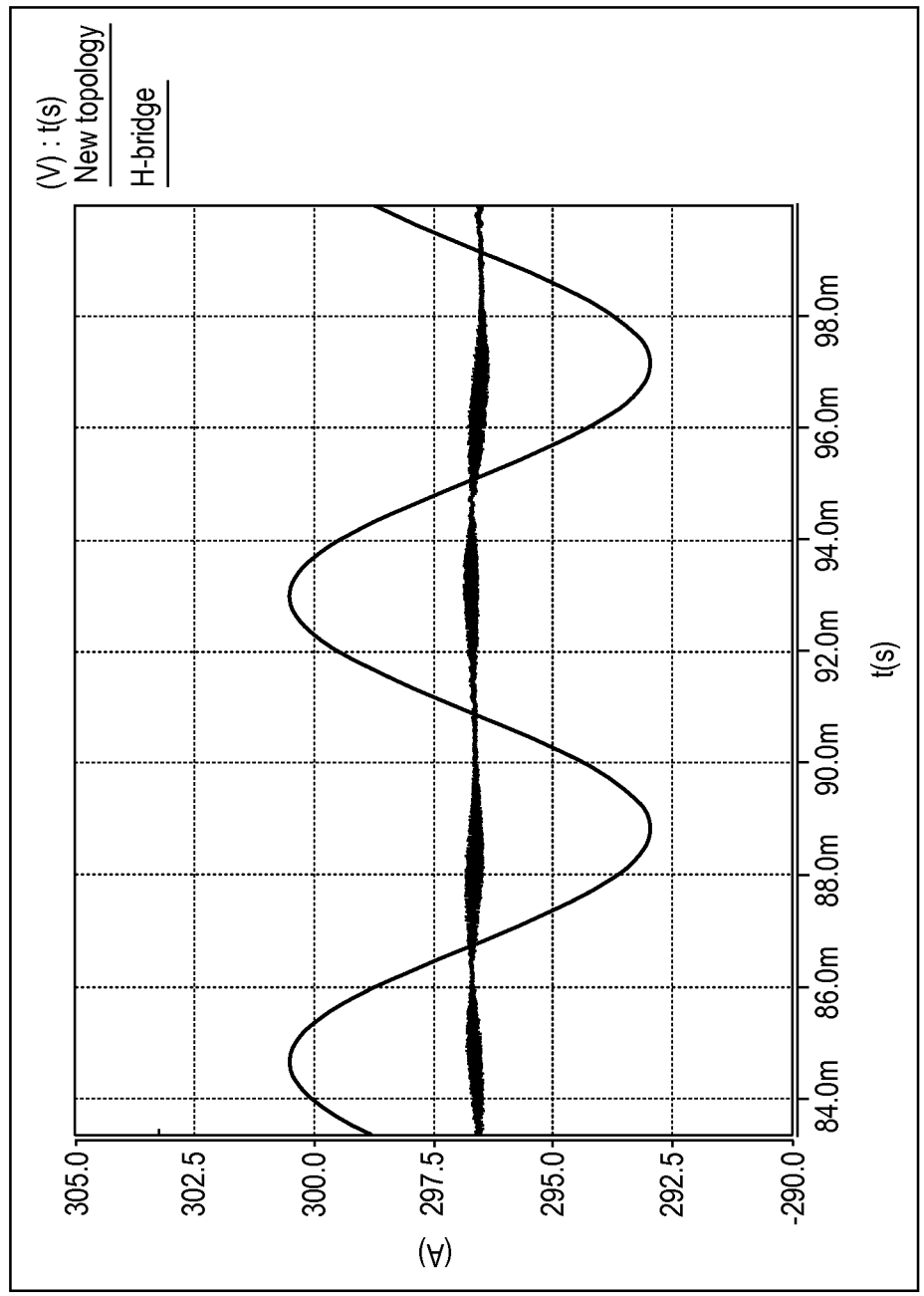
FIG. 5 is a graph of a simulated dc voltage ripple of the proposed inverter in comparison of a conventional inverter arrangement.

Based on the modulation strategy, a detailed Saber model has been built and simulations have been conducted. The simulated waveforms of the output currents are shown in FIGS. 4A and 4B. With the DC link capacitance sized 100 times smaller than the one used in conventional H-bridge inverter, the comparative dc link voltage ripple is shown in FIG. 5. It is clear that the dc link voltage ripple is significantly reduced when compared to the H-bridge.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inverter circuit, comprising:
   a capacitor coupled in parallel across a power source;
   a bridge circuit having three legs electrically connected in parallel with the voltage source and each other, each leg of the bridge circuit being comprised of an upper switch coupled in series with a lower switch;
   a low pass filter electrically connected between an output of the bridge circuit and a load, where the output of the bridge circuit is a node disposed between the two switches of a first leg of the bridge circuit;
   an auxiliary inductor having a first terminal electrically connected to a second leg of the bridge circuit and a second terminal electrically connected to electrical ground, where the second leg of the bridge circuit differs from the first leg of the bridge circuit; and
   a controller electrically coupled to the switches of the bridge circuit and operable to drive the switches of the bridge circuit in a manner that maintains instantaneous power transfer across the bridge circuit constant.

2. The inverter circuit of claim 1 wherein the capacitor is a non-electrolytic capacitor.

3. The inverter circuit of claim 2 wherein the low pass filter includes a primary inductor electrically coupled between the output of the bridge circuit and one side of the load and a primary capacitor electrically coupled in parallel across the load.

4. The inverter circuit of claim 3 wherein the output of the bridge circuit is a node disposed between the upper switch and lower switch of a first leg of the bridge circuit.

5. The inverter circuit of claim 4 wherein the first terminal of the auxiliary inductor is electrically coupled between the upper switch and the lower switch of a second leg of the bridge circuit, and a node between the upper switch and the lower switch of a third leg of the bridge circuit is electrically coupled to electrical ground.

6. The inverter circuit of claim 1 wherein the controller modulates the upper switch in each leg of the bridge circuit in accordance with $$m_{ap} = \frac{1 + v^*_a/V_{dc}}{2}$$

$$m_{bp} = \frac{v_b^*}{V_{dc}} + \frac{1 - v_a^*/V_{dc}}{2}$$

$$m_{cp} = \frac{1 - v_a^*/V_{dc}}{2}$$

where v*<sub>a</sub> is a reference for an output voltage applied from the output of the bridge circuit to the load, v*<sub>b</sub> is a reference for a voltage applied to the auxiliary inductor, and V<sub>dc</sub> is voltage from the DC voltage source.

7. The inverter circuit of claim 6 wherein the controller modulates the lower switch in each leg of the bridge circuit in a complementary manner to the upper switch in the corresponding leg of the bridge circuit.

8. The inverter circuit of claim 1 wherein the power source is further defined as a voltage source.

9. The inverter circuit of claim 1 wherein the power source is further defined as a current source.

10. An inverter circuit for use with a photovoltaic solar panel, comprising:
   a first capacitor electrically coupled in parallel across the photovoltaic solar panel;
   a bridge circuit having three legs connected in parallel with the photovoltaic solar panel and each other, each leg of the bridge circuit being comprised of an upper switch coupled in series with a lower switch;
   a primary inductor having a first terminal electrically coupled to an output of the bridge circuit and a second terminal electrically coupled to a load, where the output of the bridge circuit is a node disposed between the two switches of a first leg of the bridge circuit;
   a second capacitor electrically coupled in parallel across the load;
   an auxiliary inductor having a first terminal electrically coupled between the two switches of a second leg of the bridge circuit and a second terminal electrically coupled to electrical ground; and
   a circuit path electrically coupled between the two switches of a third leg of the bridge circuit and the load.

11. The inverter circuit of claim 10 wherein the capacitor is a non-electrolytic capacitor.

12. The inverter circuit of claim 10 wherein a node between the upper switch and the lower switch of a third leg of the bridge circuit is electrically coupled to electrical ground.

13. The inverter circuit of claim 10 further comprises a controller electrically coupled to the switches of the bridge circuit and operates to vary the load such that current and voltage output from the inverter circuit are a maximum power.

14. The inverter circuit of claim 10 further comprises a controller electrically coupled to the switches of the bridge circuit and operable to drive the switches of the bridge circuit in a manner that maintains instantaneous power transfer across the bridge circuit constant.

15. The inverter circuit of claim 14 wherein the controller modulates an upper switch in each leg of the bridge circuit in accordance with $$m_{ap} = \frac{1 + v_a^*/V_{dc}}{2}$$

$$m_{bp} = \frac{v_b^*}{V_{dc}} + \frac{1 - v_a^*/V_{dc}}{2}$$

$$m_{cp} = \frac{1 - v_a^*/V_{dc}}{2}$$

where v*<sub>a</sub> is a reference for the output voltage applied to the load, v*<sub>b</sub> is a reference for the voltage applied to the auxiliary inductor, and V<sub>dc</sub> is voltage from the DC voltage source.

16. The inverter circuit of claim 15 wherein the controller modulates the lower switch in each leg of the bridge circuit in a complementary manner to the upper switch in the corresponding leg of the bridge circuit.

* * * * *